United States Patent [19]
Nakashima et al.

[11] Patent Number: 5,741,051
[45] Date of Patent: Apr. 21, 1998

[54] ACCELERATION SLIP CONTROL SYSTEM FOR MOTOR VEHICLE

[75] Inventors: Seiichi Nakashima; Taro Hirose, both of Susono, Japan

[73] Assignee: Toyota Jidosha Kabushiki Kaisha, Toyota, Japan

[21] Appl. No.: 595,096

[22] Filed: Feb. 1, 1996

[30] Foreign Application Priority Data

Feb. 14, 1995 [JP] Japan .................... 7-025196

[51] Int. Cl.⁶ .................................................. B60T 8/58
[52] U.S. Cl. .................... 303/141; 180/197; 364/426.036
[58] Field of Search ........................... 303/139–142, 303/145, 146, 147, 148, 149, 169, 174, 112, 113.2; 180/197; 477/185, 186, 187, 184, 218; 364/426.029, 426.031, 426.033, 426.034, 426.036

[56] References Cited

U.S. PATENT DOCUMENTS

| | | | |
|---|---|---|---|
| 5,469,359 | 11/1995 | Tsuyama et al. | 180/197 X |
| 5,519,617 | 5/1996 | Hughes et al. | 180/197 X |

FOREIGN PATENT DOCUMENTS

| | | |
|---|---|---|
| A-64-16461 | 1/1989 | Japan. |
| A-3-159857 | 7/1991 | Japan. |

*Primary Examiner*—Josie Ballato
*Attorney, Agent, or Firm*—Oliff & Berridge, PLC

[57] ABSTRACT

In an acceleration slip control system for a motor vehicle, a load to act on a differential mounted in the motor vehicle is lightened to prevent the differential from seizing up. In a case where the rotational speed difference of driving wheels detected by a speed difference detector during acceleration slip control is a predetermined value or greater, the method by which the acceleration slip control is performed using a braking control device and an engine output control device is altered by a specified control unit. Braking control and/or engine output control are performed dependent upon the deviation of the speed difference of the wheels from the predetermined value, which can in turn be adjusted dependent upon the load state of the differential.

9 Claims, 7 Drawing Sheets

ACCELERATION SLIP CONTROL SYSTEM FOR MOTOR VEHICLE

BACKGROUND OF THE INVENTION

1. Field of the Invention

The present invention relates to a slip control for a motor vehicle. More particularly, it relates to an acceleration slip control system for a motor vehicle wherein an acceleration slip is suppressed by a braking control device and an engine output control device.

2. Description of the Related Art

There have heretofore been acceleration slip control systems for suppressing the so-called "acceleration slip", which is the excessive slip of a driving wheel occurring in the start mode or acceleration mode of a motor vehicle. By way of example, the official gazette of Japanese Patent Application Laid-open No. 16461/1989 discloses the control system in which, when the difference between the slips of the right and left driving wheels of the motor vehicle is a predetermined value or greater, braking forces of predetermined magnitude are simultaneously afforded to the respective driving wheels.

According to this conventional control system, in the case where the difference between the slips of the right and left driving wheels is great, the driving wheel having a lesser amount of slip is acted upon by a braking force even at times when slip control is unnecessary. Thus, this conventional control system can prevent the occurrence of the so-called opposite-phase slip in which a great torque reciprocates between the right and left driving wheels through a differential mounted in the motor vehicle.

Additionally, the official gazette of Japanese Patent Application Laid-open No. 159857/1991 discloses the acceleration slip control system in which the slip states of the right and left wheels in the acceleration mode are detected independently of each other, so as to control the braking torques of the right and left wheels independently of each other in accordance with the detected results, and in which driving forces to be bestowed on the driving wheels are controlled through an opening-and-closing control for a throttle valve. In this case, the brake control and the throttle control are balanced so that the accelerating ability of the motor vehicle can be satisfactorily brought out without exerting bad influence on the braking system thereof.

However, with either of the above-discussed techniques, even in the case of applying both the braking control and the engine output control to the acceleration slip control, the engine output of the motor vehicle is lowered strictly only on the occasion of the slippage of both the wheels, in relation to the vehicle speed thereof (driven wheel speed in the case of two-wheel drive). Accordingly, when only one wheel is slipping, the slipping is restrained by the braking force without lowering the engine output. More specifically, since the engine output with conventional slip control systems is not lowered when only one wheel is slipping, when either driving wheel is not slipping, the engine output is not lowered and the motor vehicle can be accelerated by obtaining the driving force from the non-slipping driving wheel.

Meanwhile, in a case where the motor vehicle is accelerated with the right and left driving wheels lying on road surfaces of different friction coefficients (μ), the wheel on the low-μ side slips. On this occasion, when the slip is converged by only the braking force based on the brake control, the difference between the rotational speeds of the driving wheels enlarges before the convergence of the slip in some cases. In such a case, the product (what is called the "PV value") of a relative sliding velocity V and a surface pressure P enlarges to increase the load of a differential mounted in the motor vehicle. Here, the relative sliding velocity V is a velocity which is involved between a pinion gear and a pinion shaft within the differential, and the surface pressure P is a pressure under which the pinion shaft presses the pinion gear. Under these conditions, the differential falls into a state where it is likely to seize up.

Now, letting letter k denote a constant which is determined by the type of the differential, symbol ΔN denote the difference between the rotational speeds of the driving wheels, and symbol $T_{D/S}$ denote the total of drive shaft torques on the right and left sides of the motor vehicle, the PV value is calculated by the following equation (1):

$$PV = k \times \Delta N \times T_{D/S} \tag{1}$$

The quantity of heat developed on the frictional surface (between the pinion shaft and the pinion gear), and the temperature rise of the frictional surface are proportional to the PV value. When the frictional surface has reached a certain temperature, the differential must seize up due to the rupture of an oil film. It is the PV value that determines the allowable temperature rise of the frictional surface of the differential.

The control system disclosed in above official gazette of Japanese Patent Application Laid-open No. 16461/1989 diminishes the rotational speed difference ΔN in Eq. (1). However, since the control system does not reduce the engine torque, the total drive shaft torque $T_{D/S}$ increases due to the braking, resulting in a greater PV value. Therefore, the prior-art control system is unsatisfactory for the protection of the differential.

The control system disclosed in the official gazette of Japanese Patent Application Laid-open No. 159857/1991 decreases the quantity of torque reduction based on the throttle control, in order to secure the accelerating ability when the right and left wheels lie on the road surfaces of different friction coefficients μ respectively. In consequence, the total drive shaft torque $T_{D/S}$ increases. Accordingly, as the rotational speed difference ΔN in Eq. (1) becomes great due to, e.g., the changes of the friction coefficients μ, the PV value also enlarges to increase the load of the differential.

As stated above, neither of the conventional techniques reduces the total drive shaft torques when only one wheel is slipping, so that the control does not provide sufficient protection of the differential. Moreover, the situation where only one driving wheel is slipping (where any driving wheel is not slipping) is generally coped with by the braking forces without lowering the engine output, so as not to lower the accelerating performance. Accordingly, the load on the differential is not lightened.

For the above-discussed reasons, the conventional techniques are unsatisfactory for the protection of the differential.

SUMMARY OF THE INVENTION

The present invention has been made in order to solve the problems of the related art as explained above, and has an object to provide an acceleration slip control system for a motor vehicle in which the load of a differential can be lightened more directly so as to protect the differential.

According to one aspect of the present invention in the case where the performance of the conventional acceleration slip control has been detected and where the speed difference between the right and left driving wheels has been calculated to be a predetermined value or greater, the method of the acceleration slip control being performed using the engine output control device and the braking control device is altered. Accordingly, as shown in FIG. 1 the total drive shaft torque $T_{D/S}$ (in Eq. (1)) to act on the differential is lowered by the engine output control, or the rotational speed difference $\Delta N$ (in Eq. (1)) of the right and left driving wheels is decreased by the braking control, whereby the PV value of the differential can be positively made small to lighten the load thereof. As shown in FIG. 1, the present invention allows the method of acceleration slip control being performed by the braking control and/or the engine output control to be altered whenever the speed difference between the wheels is equal to or greater than a predetermined value. For example, if it is determined by the Acceleration Slip Control State Detection Device that acceleration slip control is being performed by applying braking force to the wheels, as with Japanese Patent Application Laid-Open No. 16461/1989, and that the rotational speed difference between the wheels exceeds a predetermined value, the present invention will alter the mode of acceleration slip control by instituting a reduction in engine output.

Further, according to another aspect of present invention, the predetermined value of the speed difference between the right and left driving wheels is altered in accordance with the load state of the differential. Hence, the method by which the acceleration slip control is being performed using the engine output control device and/or the braking control device is altered in accordance with the load state of the differential. As shown in FIG. 2, acceleration slip control being performed using braking control and/or engine output control is altered dependent upon the speed difference between the wheels and the load state of the differential with resultant change in the predetermined value of the speed difference. Accordingly, for example, in the running state of the motor vehicle in which the differential steadily undergoes a heavy load, the control system can adjust the method by which acceleration slip control is performed, and the load of the differential can be lightened more appropriately.

The load of the differential may well be estimated in accordance with an accumulation of PV value.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the embodiments of the present invention will be described in detail with reference to the drawings.

Figure 1:
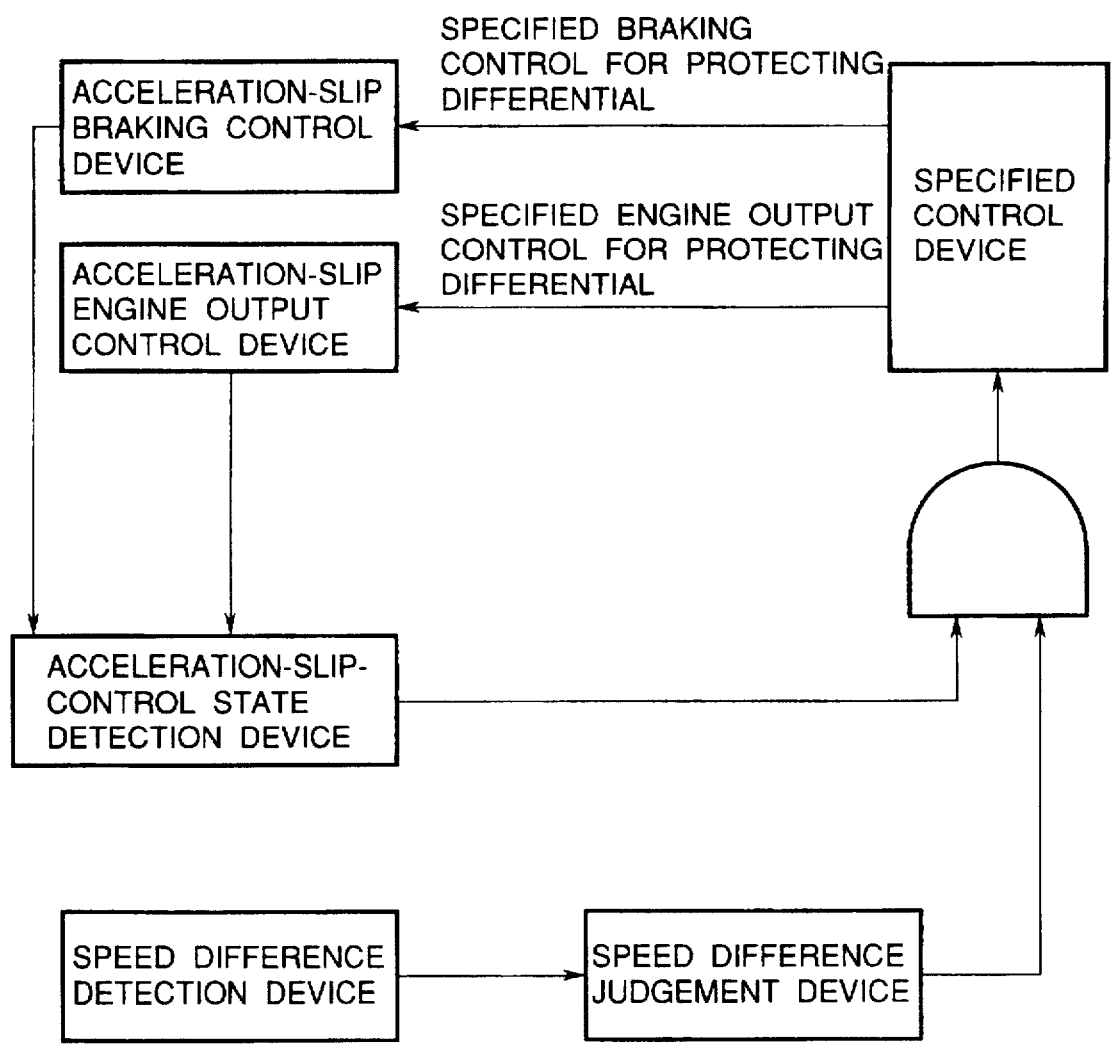
FIG. 1 is a block diagram showing a first embodiment of the present invention.

FIG. 1 shows a first embodiment of the present invention wherein acceleration slip control is altered by a specified control device. The specified control device receives input from a speed difference judgment device that detects a speed difference between the drive wheels of the vehicle, and an acceleration slip control state detection device that determines whether conventional acceleration slip control is being performed, and what method of acceleration slip control is being used. The specified control device then alters the method of acceleration slip control being performed from the method being performed by the conventional acceleration slip control if the difference in rotational speed of the wheels exceeds a predetermined amount. The specified control device thereby ensures that the loads on the differential will not exceed a desired amount. If it is determined that only braking control is being performed, but that the difference in rotational speed of the wheels still exceeds a predetermined quantity, the specified control device will institute engine output control. The engine output control can be performed whenever there is a speed difference between the drive wheels of the vehicle, including when one of the drive wheels of the vehicle is not slipping.

Figure 2:
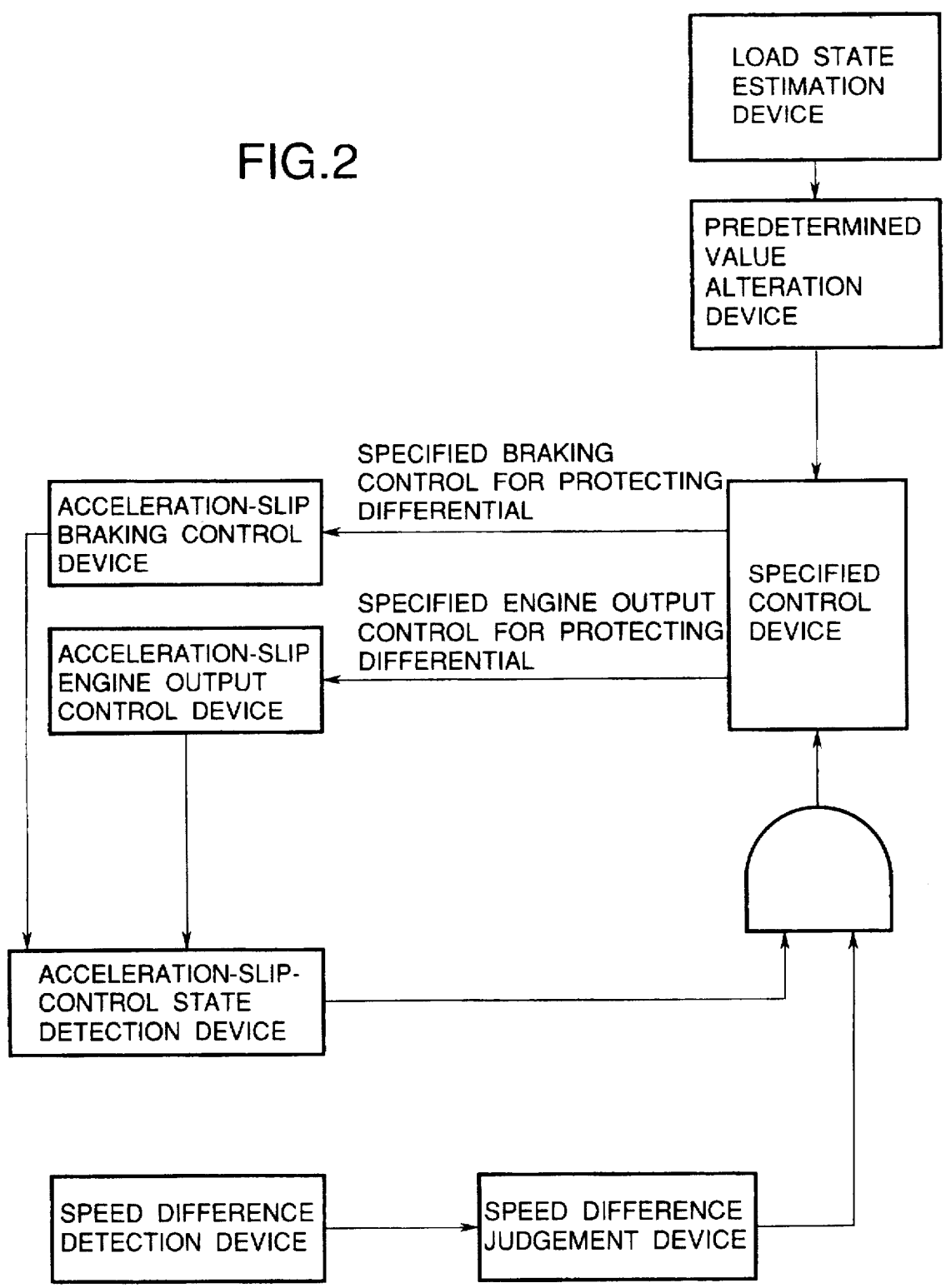
FIG. 2 is a block diagram showing a second embodiment of the present invention in which the mode of acceleration slip control is altered similarly to FIG. 1, but with the additional input of the load state of the differential and the resultant change in the predetermined value of the speed difference.

FIG. 2 shows a second embodiment of the present invention wherein the specified control device alters the mode of conventional acceleration slip control being performed similarly to the first embodiment shown in FIG. 1, but with the specified control device receiving additional input from a load state estimation device that adjusts the predetermined value for speed difference between the drive wheels based upon a load state of the differential.

Figure 3:
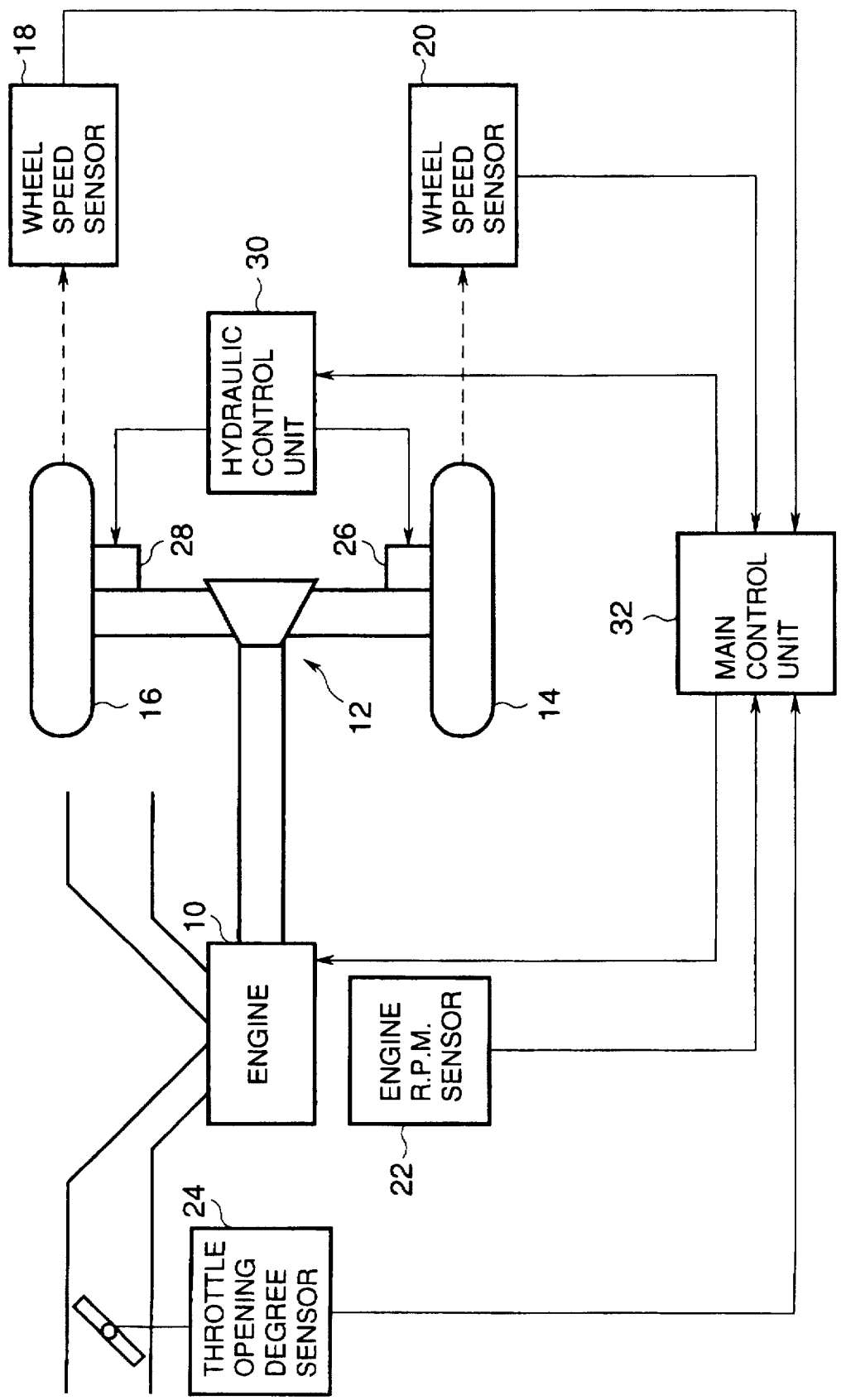
FIG. 3 is a schematic block diagram showing an acceleration slip control system for a motor vehicle to which the present invention is applied.

FIG. 3 is a schematic block diagram of an acceleration slip control system for a motor vehicle to which the present invention is applied.

Referring to FIG. 3, the motor vehicle has an engine 10, a differential 12, and a left driving wheel 14 as well as a right driving wheel 16. The control system includes wheel speed sensors 18 and 20 for detecting the rotational speeds of the driving wheels 16 and 14, respectively.

The control system also includes an engine r.p.m. sensor 22 which detects the r.p.m. of the engine 10, and a throttle opening degree sensor 24 which detects the opening degree of a throttle valve mounted in an intake system for the engine 10. A left brake 26 brakes the left driving wheel 14, while a right brake 28 brakes the right driving wheel 16. A hydraulic control unit 30 controls the brakes 26 and 28 by oil pressures.

Numeral 32 indicates a main control unit 32. Upon receiving detected signals from the individual sensors, the main control unit 32 commands the engine 10 to perform a fuel cut control and the hydraulic control unit 30 to perform a braking control, in accordance with a control flow as will be explained below.

Now, the third embodiment of the present invention will be described.

According to the third embodiment, in order to prevent the differential 12 from seizing up, in a case where the difference between the rotational speeds of the driving wheels 14 and 16 has become a threshold value (predetermined value) or greater, a specified engine output control and a specified braking control for protecting the differential 12 as will be explained later are executed with precedence taken over feedback controls for the conventional acceleration slip controls.

Figure 4:
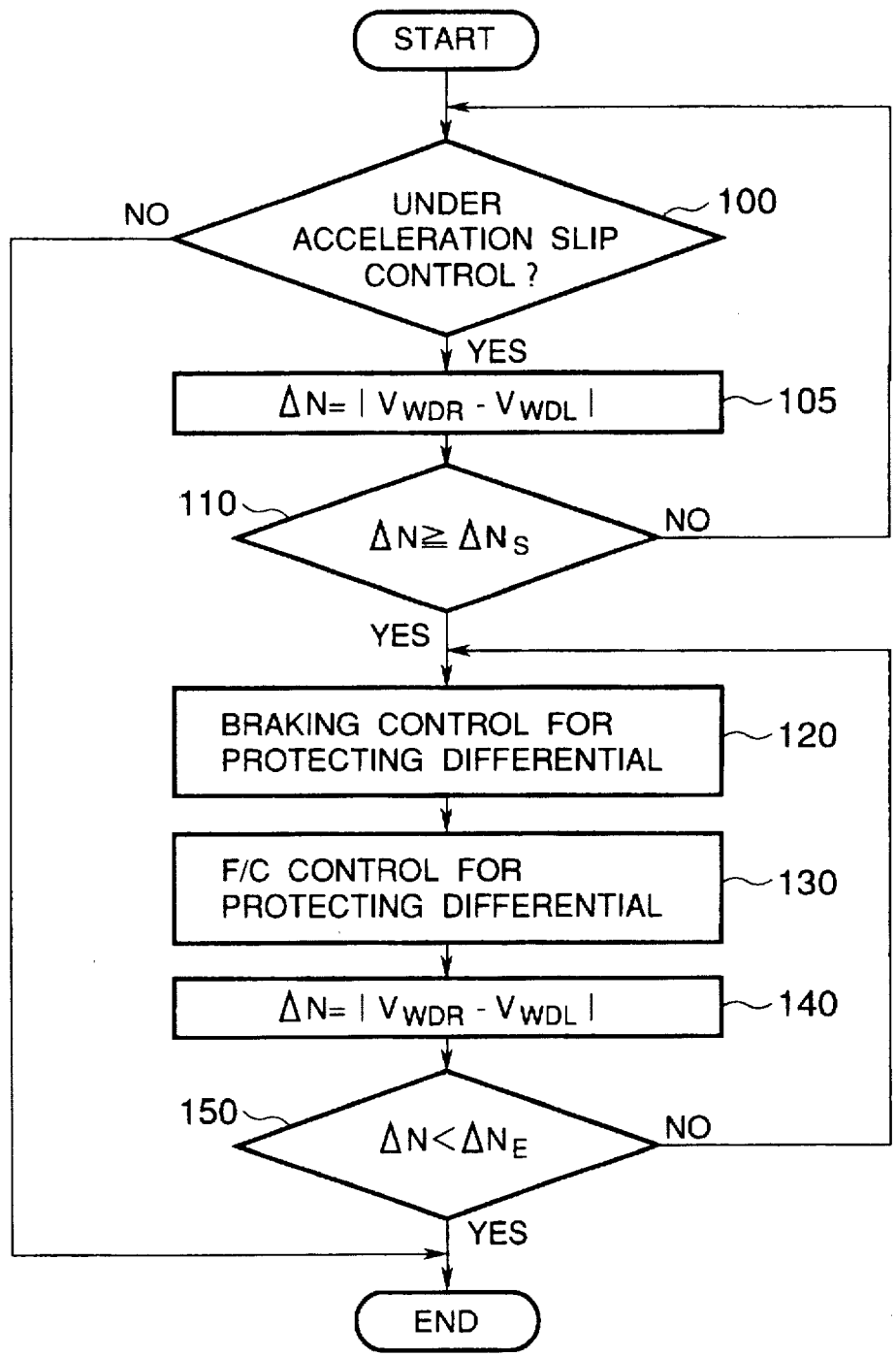
FIG. 4 is a flow chart showing controls which are executed in a third embodiment of the present invention.

FIG. 4 is a flow chart which shows the controls based on the third embodiment, and which will now be explained.

At a step 100, it is judged whether or not the conventional acceleration slip control (based on the feedback control) is proceeding. The judgement is made by the main control unit 32 itself. When the acceleration slip control is not proceeding, the braking control is not under execution, and ordinarily the rotational speed difference is not very great. Accordingly the PV value (Eq. (1)) of the differential 12 does not increase, either. Therefore, the control flow is ended without any procedure.

When the acceleration slip control is proceeding, the control flow proceeds to a step 105, at which the rotational speed difference $\Delta N = |V_{WDR} - V_{WDL}|$ between the rotational speeds of the driving wheels 14 and 16 is computed on the basis of signals detected by the wheel speed sensors 18 and 20. Here, symbol $V_{WDR}$ denotes the rotational speed of the right driving wheel 16, and symbol $V_{WDL}$ denotes that of the left driving wheel 14. Subsequently, whether or not the rotational speed difference $\Delta N$ is equal to or more than a threshold value $\Delta N_S$ is judged at a step 110.

In a case where the difference $\Delta N$ is not equal to nor more than the threshold value $\Delta N_S$, the control flow returns to the step 100. On the other hand, in a case where the difference $\Delta N$ is equal to or more than the threshold value $\Delta N_S$, the control flow advances to the next steps 120 and 130, at which the main control unit 32 gives the hydraulic control unit 30 and engine 10 the commands for performing the specified braking control and fuel cut control so as to decrease the PV value to protect the differential 12. In the braking control at the step 120, in order to diminish the rotational speed difference $\Delta N$ of the driving wheels 14 and 16, the driving wheel having greater slip is acted upon by an increased brake pressure. The increase in brake pressure is executed rapidly at the beginning of the acceleration slip control. This is intended to converge the great rotational speed difference $\Delta N$ more rapidly than with ordinary acceleration slip control, by braking the wheel 14 or 16 having greater slippage with a specified control pattern which increases the brake pressure of the corresponding brake 26 or 28.

In the fuel cut control at the step 130, the conventional feedback control is preceded by a multicylinder fuel cut control which is carried out so as to satisfy the target value of the PV value (even in such a case where one of the driving wheels 14 and 16 is not slipping), whereby the output torque of the engine 10 is reduced. The fuel cut control here is also effective to stop the opposite-phase slip between the driving wheels 14 and 16 and to diminish the rotational speed difference $\Delta N$ of these driving wheels.

Subsequently, the difference $\Delta N = |V_{WDR} - V_{WDL}|$ between the rotational speeds of the driving wheels 14 and 16 is computed at a step 140. Further, whether or not the rotational speed difference $\Delta N$ of the driving wheels 14 and 16 is less than a threshold value $\Delta N_E$ is judged at a step 150. In a case where the difference $\Delta N$ is less than the predetermined threshold value $\Delta N_E$, the specified controls for protecting the differential 12 are ended to resume the conventional feedback controls. In contrast, in a case where the difference $\Delta N$ is not less than the threshold value $\Delta N_E$, the specified controls of the steps 120 and 130 for protecting the differential 12 are continued until the difference $\Delta N$ becomes less than the threshold value $\Delta N_E$.

With the third embodiment of FIG. 4 in order to prevent the huntings of judgements on the start and end of the specified controls for the protection of the differential 12, the relationship of $\Delta N_S > \Delta N_E$ is set to give a hysteresis on conditions for starting and ending the specified protective controls. Moreover, the relationship of $\Delta N_S > (V_t - V_e)$ is set to prevent the specified controls from directly beginning earlier than the conventional acceleration slip controls. Here, $V_t$ denotes a target vehicle speed, $V_e$ denotes a estimated vehicle speed. By way of example, the target vehicle speed $V_t$ in the high-speed drive state of the motor vehicle is given as a value which is larger than the estimated vehicle speed $V_e$ by the product of this estimated vehicle speed $V_e$ and a slip factor (3~5[%]), namely, 1.03 $V_e$~1.05 $V_e$ [km], and the target vehicle speed $V_t$ in the low-speed drive state thereof is given as a value which is obtained by adding a predetermined value (3~5 [km]) to the estimated vehicle speed, namely, $V_e$+(3~5) [km]. The estimated vehicle speed $V_e$ is the vehicle speed which is estimated from the speeds of the unshown driven wheels of the motor vehicle.

Next, the fourth embodiment of the present invention shown in FIG. 5 will be explained.

Even when the specified controls for protecting the differential 12 as described above are carried out, these specified controls might fail to protect the differential 12 under certain circumstances, for example, a situation where the motor vehicle repeats a severe drive in which it is accelerated under a wide-open-throttle condition with the right and left driving wheels 16 and 14 lying on road surfaces of different friction coefficients (µ). In this situation, loads are gradually accumulated in the differential 12. In spite of the specified protective controls, accordingly, the differential 12 might seize even if the actual load of the differential 12 acting at a particular time noted is not so heavy.

In the second embodiment, therefore, the load state of the differential 12 is estimated in terms of the PV value. More specifically, the PV values are calculated and accumulated. When the accumulated PV value has become large, the aforementioned threshold values $\Delta N_S$ and $\Delta N_E$ for deciding the conditions for starting and ending the specified protective controls are changed-over so that the acceleration slip control system modifies the specified controls in order to better protect the differential 12.

The calculation of the PV value, the accumulation of the PV values, the estimation of the load state, the alterations of the predetermined values, etc. to be explained below are all processed by the main control unit 32.

Figure 5:
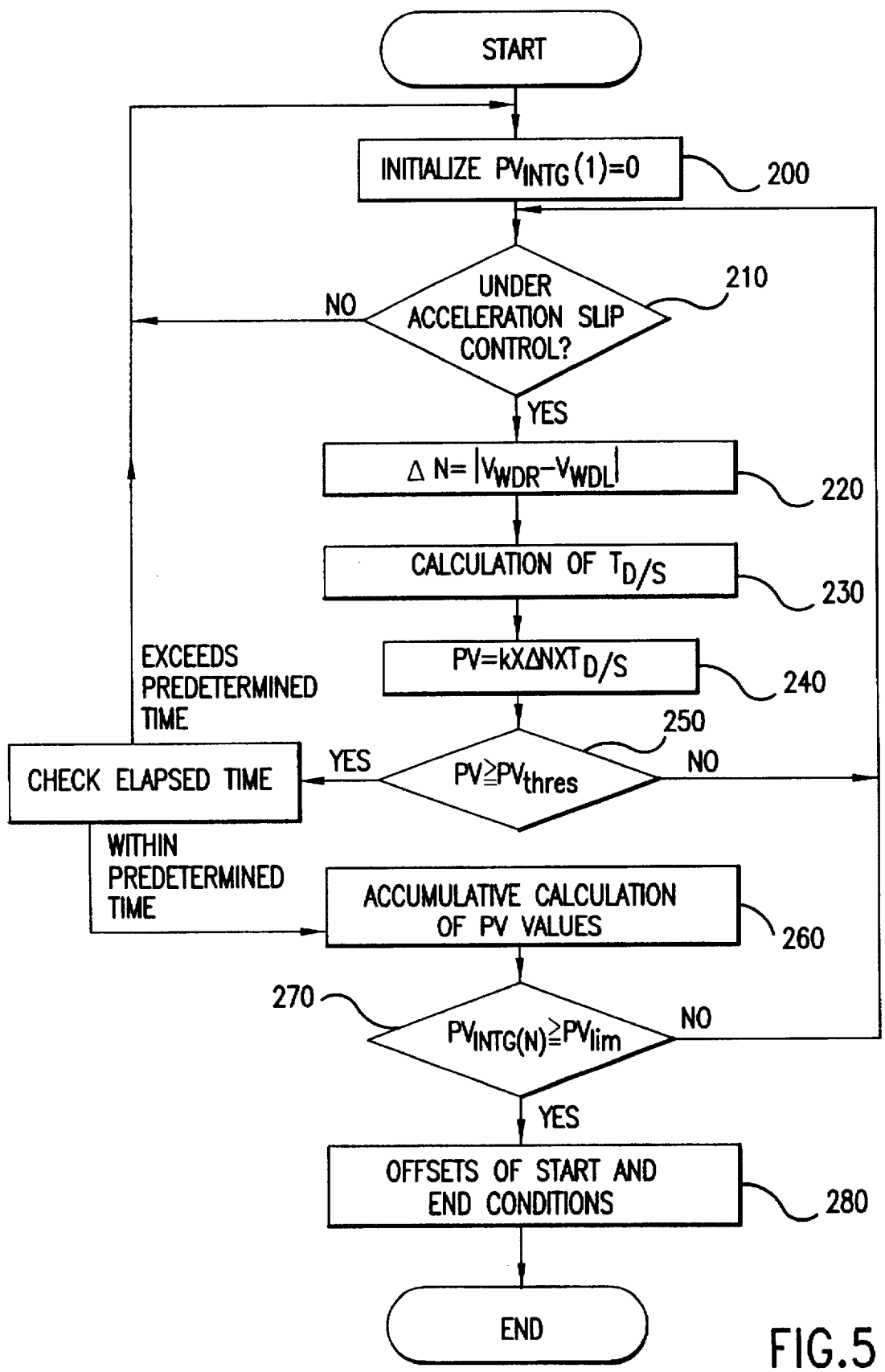
FIG. 5 is a flow chart showing controls which are executed in a fourth embodiment of the present invention.

FIG. 5 is a flow chart showing the control flow of the second embodiment.

First, at a step 200, a value $PV_{INTG(1)} = 0$ is set as the initial value of the accumulative load of the differential 12.

Subsequently, whether or not the acceleration slip control is proceeding is judged at a step 210. In a case where the conventional acceleration slip control is not proceeding, the braking control is not under execution, and hence, the PV value enlarges infrequently. Therefore, the control flow returns to the step 200 without calculating the load of the differential 12.

In a case where the conventional acceleration slip control is proceeding, the control flow proceeds to a step 220, at which the difference $\Delta N = |V_{WDR} - V_{WDL}|$ between the rotational speeds of the right and left driving wheels 16 and 14 is computed.

At the next step 230, the total drive shaft torque $T_{D/S}$ (in Eq. (1)) is calculated. During the acceleration slip control, the total torque $T_{D/S}$ is substantially equal to a value which is obtained by multiplying the output torque of the engine 10 by (both) a transmission gear ratio "$i_{T/M}$" and a differential ratio "$i_{diff}$". It is therefore computed in accordance with the following equation (2):

$$T_{D/S} = (T_E - T_{F/C}) \times i_{diff} \times i_{T/M} \quad (2)$$

Here, symbol $T_E$ denotes the engine output torque, which is obtained from a map of throttle opening degree and engine r.p.m. on the basis of values detected by the throttle opening degree sensor 24 and the engine r.p.m. sensor 22. Symbol $T_{F/C}$ denotes that quantity of engine torque reduction which is based on the fuel cut control, and which is calculated by a proportional computation from the engine output torque $T_E$ and an engine torque generated when all the cylinders of the engine 10 have fuel cut.

At the next step 240, the PV value of the differential 12 is calculated. It is calculated in accordance with Eq. (1) mentioned before.

Subsequently, whether or not the calculated PV value is equal to or more than a threshold value $PV_{thres}$ is judged at a step 250. In a case where the PV value is less than the threshold value $PV_{thres}$, the differential 12 is judged as having an infinite lifetime. In this case, the control flow returns to the step 210 without executing the accumulative calculation of the load of the differential 12.

Figure 6:
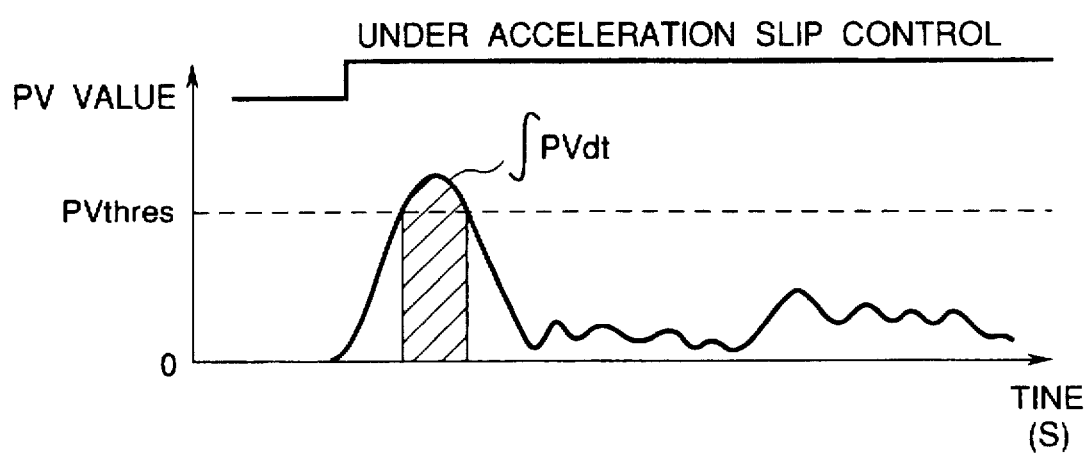
FIG. 6 is a graph showing the PV value of a differential in the wide-open-throttle acceleration mode of the motor vehicle in the case where the right and left driving wheels of the motor vehicle lie on road surfaces of different friction coefficients respectively.

In a case where the PV value is equal to or more than the threshold value $PV_{thres}$, the accumulative calculation of the PV values is executed at a step 260. More specifically, as shown in FIG. 6, the PV value is integrated (every $\Delta t=24$ [ms]) for a part of a PV value area (shown with the hatching) at which the threshold value $PV_{thres}$ is exceeded. The integrated PV value is accumulatively added to the last result $PV_{INTG(n-1)}$ as indicated by the following equation (3):

$$PV_{INTG(n)} = PV_{INTG(n-1)} + \int PV \, dt \quad (3)$$

The resulting load accumulation value $PV_{INTG(n)}$ is stored in the main control unit 32.

Subsequently, whether or not the load accumulation value $PV_{INTG(n)}$ is equal to or more than a threshold value $PV_{lim}$ is judged at a step 270. In a case where the accumulation value $PV_{INTG(n)}$ is not equal to nor more than the threshold value $PV_{lim}$, the control flow returns to the step 210 so as to further continue the accumulation. On the other hand, in a case where the accumulation value $PV_{INTG(n)}$ has become equal to or more than the threshold value $PV_{lim}$, it is judged that the load of the differential 12 has become excessive. In this case, at the next step 280, the predetermined values $\Delta N_S$ and $\Delta N_E$ for the conditions for starting and ending the specified controls as shown in FIG. 4 are respectively offset by an amount KV to obtain new threshold values $\Delta N_S$ and $\Delta N_E$ so as to facilitate the beginnings of the specified controls for protecting the differential 12, as indicated by the following equation (4):

$$\Delta N_S \leftarrow \Delta N_S - KV$$

$$\Delta N_E \leftarrow \Delta N_E - KV \quad (4)$$

Here, a lower-limit guard is set for the offset KV, and it is made more than the value $\Delta N_S = V_{wt} - V_{we}$, wherein $V_{wt}$ denotes target wheel speed, and $V_{we}$ denotes estimated wheel speed.

As explained above, the specified controls for protecting the differential 12 are executed when the rotational speed difference $\Delta N$ of the driving wheels has become the predetermined value $\Delta N_S$ or more than during the acceleration slip control. In the third embodiment as shown in FIG. 4, the specified controls are executed immediately each time when the rotational speed difference $\Delta N$ has reached the value $\Delta N_S$. On the other hand, in the fourth embodiment as shown in FIG. 5, when the load of the differential 12 accumulated has reached the certain degree, the predetermined values $\Delta N_S$ and $\Delta N_E$ for executing the specified controls are altered to facilitate the beginnings of the specified controls.

The accumulated load in the fourth embodiment is calculated only during a particular acceleration slip control operation. When the acceleration slip control has ended, the accumulative value $PV_{INTG}$ is cleared to zero.

In some cases, however, the motor vehicle is restarted immediately after its ignition key has been turned off. In such a situation, it is also apprehended that the differential 12 bearing a considerable accumulative load will undergo a further load which might lead to the seizure thereof. The situation may well be coped with as follows: A threshold value is set in addition to the threshold value $PV_{lim}$. When the load accumulation value $PV_{INTG(n)}$ is equal to or more than the additional threshold value, the data of this accumulation value are stored in, e. g., the backup RAM of the main control unit 32 even at the turn-off of the ignition key. The stored data are used in the next accumulative calculation so as to further continue the accumulation.

Figure 7:
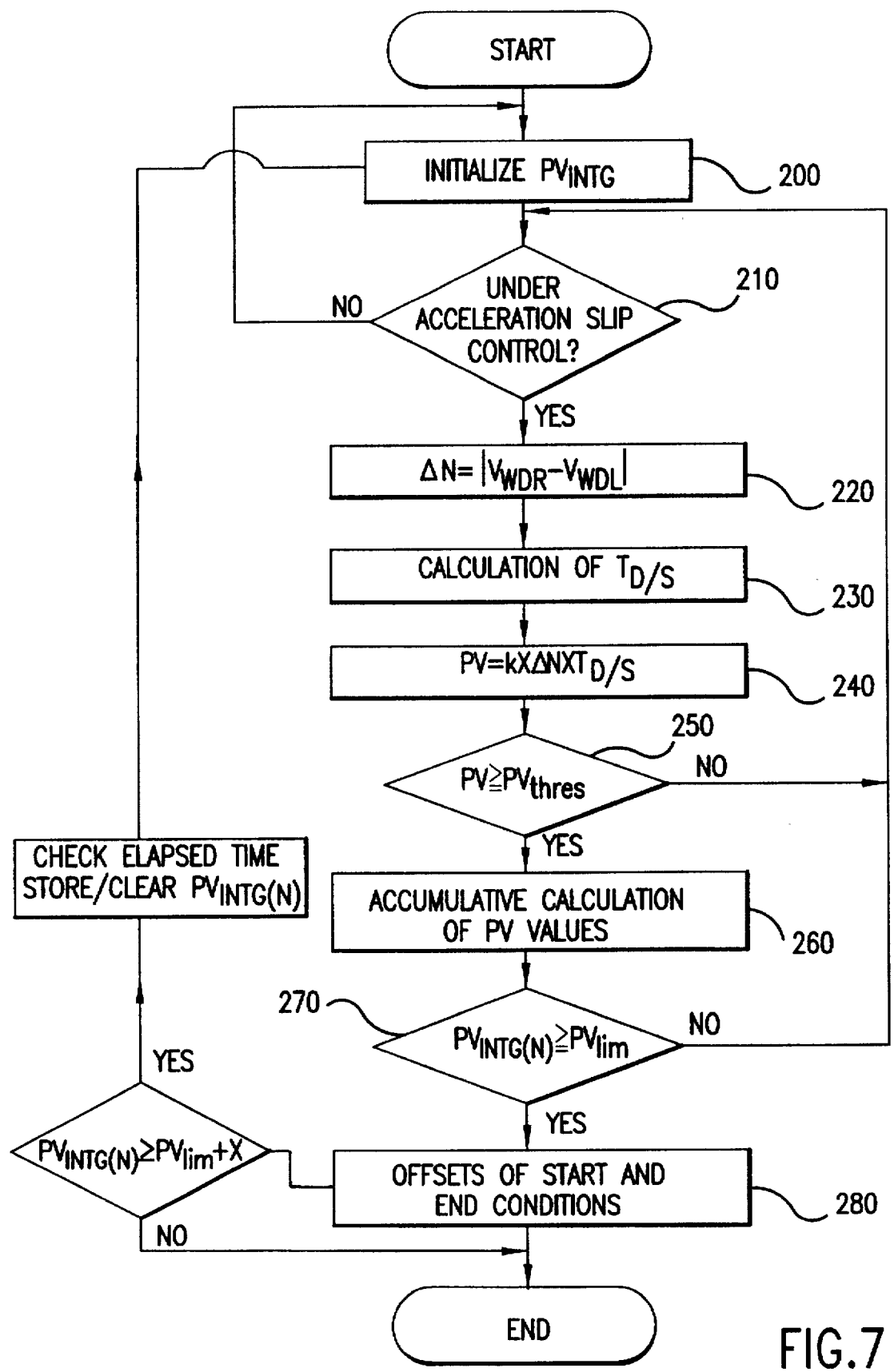
FIG. 7 is a flow chart showing the accumulation of loads on the differential only during a predetermined time period.

In a case where the accumulative value $PV_{INTG(n)}$ has once been increased, but then the engine 10 has continued to run without additional increase of $PV_{INTG}$, the temperature of the differential 12 will be low after the lapse of a long time since the enlargement of this accumulative value. Therefore, the differential 12 is not apprehended to seize up any longer. Accordingly as shown FIG. 7, the control system may well be so constructed that a time period for accumulating the PV values is determined beforehand, that the PV values are accumulated during the determined time period, and that the accumulative value is cleared to zero when it does not exceed a prescribed value within the determined time period. Thus, the differential 12 can be protected more effectively.

As described above, according to the present invention, the method of performing acceleration slip controls is altered when the rotational speed difference of right and left driving wheels has become equal to or more than a predetermined value. Therefore, the invention brings forth the effect that a load of a differential can be lightened and the differential can be prevented from seizing up.

Moreover, in a case where the load state of the differential is estimated and where the predetermined value of the speed difference between the wheels is altered in accordance with the estimated load state, the differential can be effectively protected even in a drive state in which a load continues to act on the differential.

What is claimed is:

1. An acceleration slip control system for a motor vehicle having driving wheels, said system comprising:

braking control means for applying a braking force to at least one of the driving wheels to control acceleration slip;

engine output control means for regulating an engine output of the motor vehicle to control acceleration slip;

speed difference detecting means for detecting a rotational speed difference between the driving wheels;

speed difference comparison means for determining whether said speed difference between the driving wheels is equal to or greater than a predetermined value;

acceleration slip control detection means for detecting an acceleration slip control by at least one of said braking control means and said engine output control means; and main control means for altering a method of acceleration slip control being performed so that at least said engine output control means further or newly reduces the engine output of the motor vehicle when said speed difference comparison means determines that a rotational speed difference between the driving wheels is equal to or greater than a predetermined value and said acceleration slip control is detected by said acceleration slip control detection means.

2. The acceleration slip control system according to claim 1, wherein:

said main control means also actuates said braking control means to increase brake pressure rapidly at a beginning of said acceleration slip control.

3. The acceleration slip control system according to claim 1, wherein:

said main control means actuates said engine output control means such that said engine output control means performs a multicylinder fuel cut control in order to reduce an output of the engine of the motor vehicle.

4. The acceleration slip control system according to claim 1, further comprising:

estimating means for estimating a load state of a differential mounted on the motor vehicle; and offset means for altering said predetermined value of the rotational speed difference between the driving wheels as a function of said estimated load state of the differential.

5. The acceleration slip control system according to claim 4, further comprising:

accumulation means for adding up values of said estimated load states and providing the sum of said load state values to said offset means so that said offset means only alters said predetermined value when said sum of load state values is greater than or equal to a second predetermined value.

6. The acceleration slip control system according to claim 5, wherein:

said sum of load state values is stored in a temporary electronic memory when said sum of load state values is greater than or equal to a third predetermined value that is greater than said second predetermined value.

7. The acceleration slip control system according to claim 5, wherein:

said accumulation means only adds said estimated load state values during a time period that is less than or equal to a predetermined maximum time period.

8. A method for performing an acceleration slip control of a motor vehicle, said method including the steps of:

detecting a rotational speed difference between driving wheels of the motor vehicle;

comparing the detected speed difference with a predetermined value;

detecting an acceleration slip control being performed by at least one of a braking control means and an engine output control means; and altering a method of said acceleration slip control being performed to further or newly reduce the engine output when said detected speed difference is greater than or equal to said predetermined value and said acceleration slip control being performed is detected.

9. The method of acceleration slip control according to claim 8, further including the steps of:

estimating a load state on a differential of the motor vehicle;

comparing the estimated load state to a second predetermined value; and modifying said predetermined value when said estimated load state is greater than or equal to said second predetermined value.

\* \* \* \* \*